United States Patent
Itoh

(10) Patent No.: US 7,394,578 B2
(45) Date of Patent: Jul. 1, 2008

(54) FACSIMILE DEVICE READING LINES OF IMAGE DATA DIVISIVELY IN A SUB-SCANNING DIRECTION

(75) Inventor: Nobuhiro Itoh, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 876 days.

(21) Appl. No.: 10/054,147

(22) Filed: Jan. 21, 2002

(65) Prior Publication Data

US 2002/0097443 A1    Jul. 25, 2002

(30) Foreign Application Priority Data

Jan. 23, 2001   (JP) .............................. 2001-014980

(51) Int. Cl.
   *H04N 1/04* (2006.01)
(52) U.S. Cl. ...................... 358/474; 358/539; 358/540; 358/450; 358/426.07; 358/442; 382/284; 382/199; 382/217
(58) Field of Classification Search ................ 358/500, 358/539, 540, 450, 474, 426.07, 505, 1.2, 358/402, 403; 382/245, 238, 284, 294, 199
See application file for complete search history.

(56) References Cited

U.S. PATENT DOCUMENTS

| | | | | |
|---|---|---|---|---|
| 5,287,203 A | * | 2/1994 | Namizuka | 358/443 |
| 5,452,105 A | * | 9/1995 | Tamagaki et al. | 358/453 |
| 5,465,163 A | * | 11/1995 | Yoshihara et al. | 382/284 |
| 5,592,304 A | * | 1/1997 | Udagawa et al. | 358/444 |
| 5,991,450 A | * | 11/1999 | Ohsawa et al. | 382/245 |
| 6,002,492 A | * | 12/1999 | Kamon et al. | 358/450 |
| 6,148,118 A | * | 11/2000 | Murakami et al. | 382/284 |
| 6,223,181 B1 | * | 4/2001 | Goldberg et al. | 707/101 |
| 6,407,746 B1 | * | 6/2002 | Tanizawa | 345/649 |
| 6,442,302 B2 | * | 8/2002 | Klassen | 382/296 |
| 6,690,482 B1 | * | 2/2004 | Toyoda et al. | 358/1.2 |

FOREIGN PATENT DOCUMENTS

| | | |
|---|---|---|
| JP | 61-198873 | 9/1986 |
| JP | 1-161968 | 6/1989 |
| JP | 3-232374 | 10/1991 |
| JP | 8-181851 | 7/1996 |

* cited by examiner

*Primary Examiner*—Edward Coles
*Assistant Examiner*—Negussie Worku
(74) *Attorney, Agent, or Firm*—Cooper & Dunham, LLP

(57) ABSTRACT

This facsimile device comprises inputting means for inputting image data of a subject copy having a width in a main scanning direction larger than an A3-size width, reading means for divisively reading lines of the image data in a sub-scanning direction by dividing the image data into divisional lines of data having a predetermined width, image rotating means for performing an image rotation with respect to each of the divisional lines of data so as to supply rotated divisional lines, encoding means for encoding each of the rotated divisional lines into encoded data, and outputting means for outputting the encoded data.

12 Claims, 3 Drawing Sheets

FACSIMILE DEVICE READING LINES OF IMAGE DATA DIVISIVELY IN A SUB-SCANNING DIRECTION

BACKGROUND OF THE INVENTION

1. Field of the Invention

The present invention generally relates to a facsimile device and a controlling method thereof, and more particularly, to a facsimile device reading and transmitting a large-size subject copy, and a controlling method thereof.

2. Description of the Related Art

Conventionally, when a facsimile device reads and transmits a large-size subject copy, the conventional facsimile device divides image data of the subject copy in a main-scanning direction, and transmits the divided image data of the subject copy.

However, according to the above-mentioned conventional method, when a size of the subject copy is longer in a sub-scanning direction than a recording paper having a standard size, the subject copy needs to undergo a further dividing process in a device receiving the transmitted image data of the subject copy, depending on a size of a recording paper set in the receiving device.

SUMMARY OF THE INVENTION

It is a general object of the present invention to provide an improved and useful facsimile device in which the above-mentioned problems are eliminated.

A more specific object of the present invention is to provide a facsimile device which divides a subject copy in a sub-scanning direction into image data not larger than a standard size so as not to necessitate a dividing process or a reducing process in a device receiving the image data of the subject copy, which prevents even slight image data from being omitted due to an error in a dividing process, when divisively reading image data in the vicinity of a central part of a subject copy where image information such as characters may likely converge, which can transmit a form, such as a cover form not requiring a dividing process, as a first page along with a large-size subject copy, and which compensates for an error in operation by reducing a subject copy set as a first page to an A3-size width transmittable according to a communications protocol, when the subject copy set as the first page is larger than the A3-size width, and a divisional reading is not specified to the first page, such as a cover form.

In order to achieve the above-mentioned objects, there is provided according to the present invention a facsimile device, and a controlling method thereof, the facsimile device comprising:

inputting means for inputting image data of a subject copy having a width in a main scanning direction larger than an A3-size width;

reading means for divisively reading lines of the image data in a sub-scanning direction by dividing the image data into divisional lines of data having a predetermined width;

image rotating means for performing an image rotation with respect to each of the divisional lines of data so as to supply rotated divisional lines;

encoding means for encoding each of the rotated divisional lines into encoded data; and outputting means for outputting the encoded data.

According to the present invention, the facsimile device can smoothly send the image of a subject copy, such as a drawing, which is larger than an A3-size width transmittable according to a communications protocol, and should be transmitted with an unchanged scale so as to keep fine parts clearly visible.

Additionally, in the facsimile device according to the present invention, the reading means may divisively read the lines of the image data in the sub-scanning direction by scanning a plurality of areas of the image data sharing an overlapping width predetermined in the sub-scanning direction.

According to the present invention, it is possible to reproduce image data faithfully in the vicinity of a central part of a subject copy where image information such as characters may likely converge, due to the overlapping width surely maintaining the image data in the vicinity of the divided part around the central part of the subject copy.

Additionally, in the facsimile device according to the present invention, the reading means may divisively read the lines of the image data in the sub-scanning direction by dividing the image data of the subject copy at a predetermined page into the divisional lines of data.

According to the present invention, the size of a subject copy at a first page, such as a cover form, does not have to be made equal to the size of a large-size subject copy that follows the first page. This shortens a transmission time.

Additionally, in the facsimile device according to the present invention, the reading means may reductively read image data of a subject copy having a width larger than the A3-size width by reducing the image data as a whole to the A3-size width, when the subject copy is not at a page to be divisively read.

According to the present invention, when a subject copy attached at a first page as a cover form, etc., is larger in size than the A3-size width transmittable according to a communications protocol, the subject copy is subjected to a reducing process. This not only shortens a transmission time, but also ensures the transmission of the image data of the subject copy to a receiving device without causing any problem despite the erroneous selection of the size of the form at the first page.

Other objects, features and advantages of the present invention will become more apparent from the following detailed description when read in conjunction with the accompanying drawings.

DETAILED DESCRIPTION OF THE PREFERRED EMBODIMENTS

A description will now be given, with reference to the drawings, of embodiments of a facsimile device and a controlling method thereof according to the present invention. FIG. 1 to FIG. 4 illustrates the embodiments of the facsimile device and the controlling method thereof according to the present invention.

Figure 1:
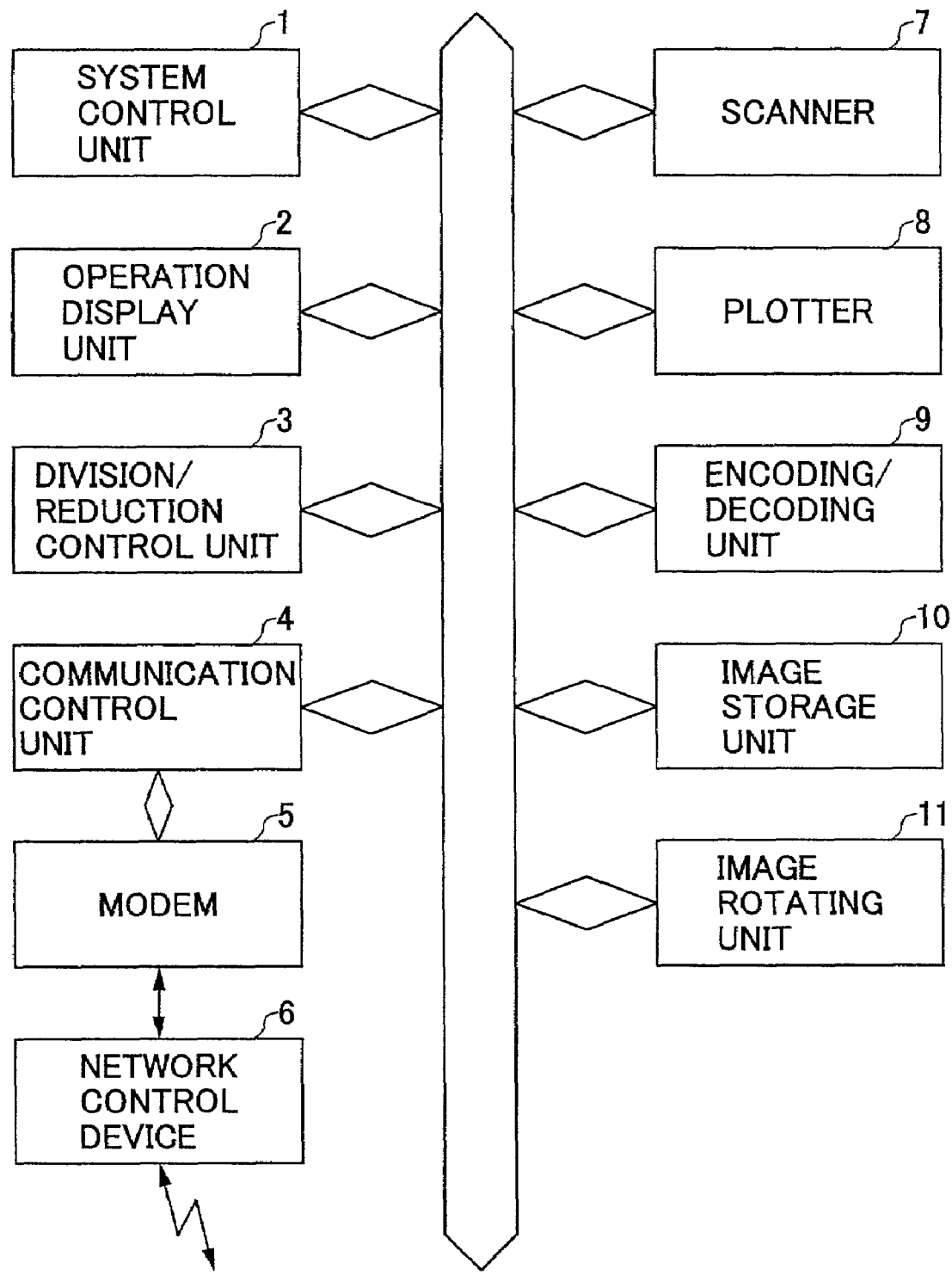
FIG. 1 is a block diagram of a structure of a facsimile device according to an embodiment of the present invention.

FIG. 1 is a block diagram of a structure of the facsimile device according to the embodiment of the present invention.

In FIG. 1, the facsimile device according to the present embodiment comprises a system control unit 1, an operation display unit 2, a division/reduction control unit 3 (reading means), a communication control unit 4, a modem 5, a network control device 6, a scanner 7 (inputting means), a plotter 8 (outputting means), an encoding/decoding unit 9 (encoding means), an image storage unit 10, and an image rotating unit 11 (image rotating means).

The system control unit 1 manages and controls operations of the above-mentioned facsimile device as a whole, and supplies operation commands to each of the above-mentioned components via a system bus.

The operation display unit 2 comprises various operation keys provided for an operator to operate the facsimile device arbitrarily, and various display devices provided for displaying matters, such as messages from the facsimile device to the operator.

The division/reduction control unit 3 judges whether or not a size in a main scanning direction of image information read by the scanner 7 is larger than an A3-size width which is a maximum width supposed to be communicable according to a communications protocol. When the size is larger than the A3-size width, the division/reduction control unit 3 judges whether or not the read page is to be divided, and reads the page by dividing, or by reducing the page as a whole to the A3-size width.

The communication control unit 4 performs a facsimile transmission according to a predetermined transmission control procedure. The modem 5 modulates a transmission signal and demodulates a received signal. The communication control unit 4 is connected via the modem 5 and the network control device 6 to a transmission network (e.g., a public telephone line).

The scanner 7 resolves a transmission image into pixels at a predetermined resolution, and converts each of the pixels to a monochrome image signal.

The plotter 8 outputs an image by recording the image on paper at the same resolution as the scanner 7.

The encoding/decoding unit 9 encodes image information to be transmitted according to a predetermined method so as to compress the amount thereof, and decodes received encoded image information into original image information thereof.

The image storage unit 10 temporarily stores image information read by the scanner 7 for the purpose of applying image editions to the read image, such as an image rotation and an image reduction.

The image rotating unit 11 interchanges image data in a main-scanning direction and image data in a sub-scanning direction included in the image information stored in the image storage unit 10, and restores the rotated image information (including the interchanged image data) in the image storage unit 10. In this course, the rotation angle of the image information is 90 degrees or 270 degrees.

According to the above-described structure, the facsimile device of the present invention can transmit a large-size subject copy all at one transmission operation, and also can transmit a subject copy by dividing the subject copy fewer times. Therefore, the facsimile device of the present invention can reproduce an original image more faithfully, and can transmit the reproduced image as an image with the same magnification as the original image.

Figure 2:
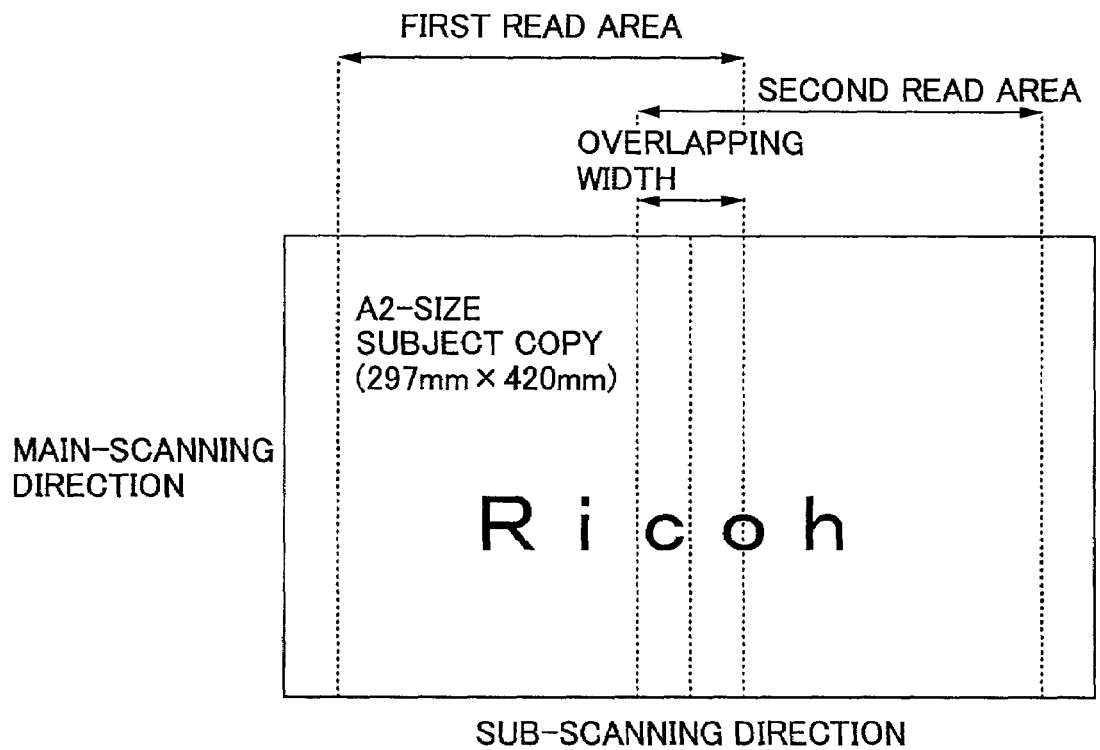
FIG. 2 illustrates a specific example of divisively reading a large-size subject copy.

FIG. 2 illustrates a specific example of processes performed in the facsimile device according to the embodiment of the present invention so as to read a large-size subject copy by dividing/reducing the large-size subject copy. As shown in FIG. 2, when a large-size subject copy is read by dividing the image thereof into two read areas sharing an overlapping width determined voluntarily by an operator, positions which the first read area and the second read area are read from are varied according to the overlapping width. This overlapping width minimizes a possibility that image data in the vicinity of a division line be omitted by failing to be read accurately.

Figure 3:
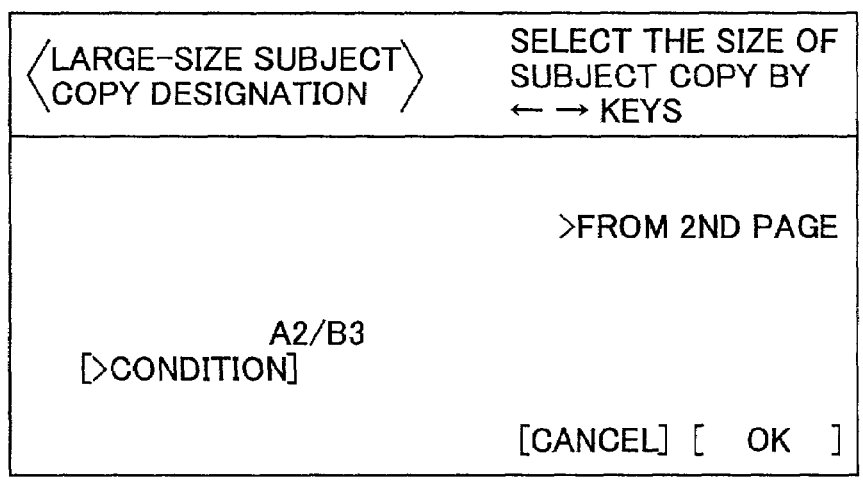
FIG. 3 is an illustration of a display example of an operation display unit used to select a first page of a large-size subject copy upon divisively reading the large-size subject copy.

FIG. 3 illustrates a specific example of a method of selecting a first page upon reading a large-size subject copy by dividing the large-size subject copy in the facsimile device according to the embodiment of the present invention. When a document is sent via a facsimile device, a cover form is customarily accompanied with the document. Accordingly, upon sending such a cover form along with a large-size subject copy by the facsimile device according to the present embodiment, an operator can specify differences in controlling the divisional reading of the large-size subject copy, with respect to the reading of the cover form, in an initial transmission setting via a use-friendly transmission operation screen as shown in FIG. 3.

Figure 4:
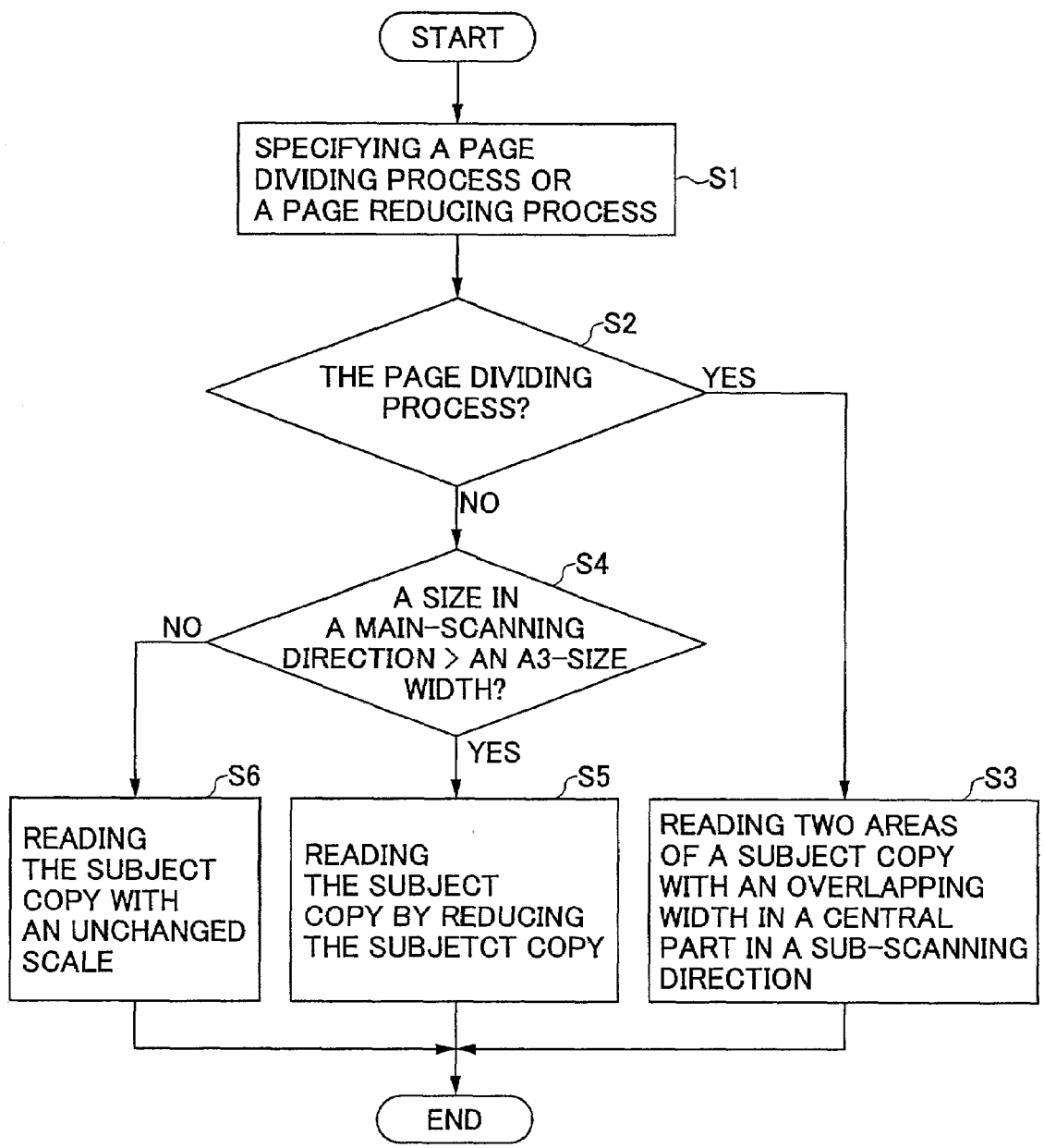
FIG. 4 is a flowchart of an example of processes performed in the facsimile device according to the embodiment of the present invention.

FIG. 4 is a flowchart of an example of processes performed in the facsimile device according to the embodiment of the present invention so as to read a large-size subject copy by dividing/reducing the large-size subject copy. First, an operator specifies which of a page dividing process and a page reducing process is to be performed to a subject copy to be transmitted (step S1).

When the page dividing process is specified in the step S2 (step S2/Yes), the first read area and the second read area of the subject copy are read with an image in the overlapping width voluntarily determined in the central part in the sub-scanning direction being read twice (step S3).

When the page dividing process is not specified in the step S1 (step S2/No), it is judged whether or not a size of the subject copy in the main scanning direction is larger than the A3-size width (step S4). When the size in the main scanning direction is larger than the A3-size width (step S4/Yes), the subject copy is read by being reduced to the A3-size width (step S5).

When the size in the main scanning direction is not larger than the A3-size width (step S4/No), the subject copy is read with an unchanged scale (step S6).

The present invention is not limited to the specifically disclosed embodiments, and variations and modifications may be made without departing from the scope of the present invention.

The present application is based on Japanese priority application No. 2001-014980 filed on Jan. 23, 2001, the entire contents of which are hereby incorporated by reference.

What is claimed is:

1. A facsimile device comprising:
    inputting means including scanner means to scan a large-sized subject copy having a size larger than A3-size and generate large-sized copy image data based on the scanning of said subject copy;
    dividing means for automatically dividing in a sub-scanning direction said large-sized copy image data of said subject copy of the size larger than the A3-size into a plurality of read areas according to a specified overlapping width, each read area including divisional lines of data having a predetermined width;
    image rotating means for performing an image rotation with respect to each of said divisional lines of data so as to supply rotated divisional lines;
    encoding means for encoding each of said rotated divisional lines into encoded data; and
    outputting means for outputting said encoded data.

2. The facsimile device as claimed in claim 1, wherein said dividing means divides said large-sized image data in said sub-scanning direction into said read areas, each read width having no greater than an A3-size width.

3. The facsimile device as claimed in claim 1, wherein said dividing means divides said lines of said large-sized image data in said sub-scanning direction by dividing said large-sized image data of the subject copy at a predetermined page into said divisional lines of data.

4. The facsimile device of claim 1, wherein said dividing means detects whether the width of said subject copy in the main scanning direction is larger than A3-size width, and if the width of said subject copy is larger than an A3-sized width, automatically dividing said subject copy in the sub-scanning direction into at least two portions.

5. The facsimile device of claim 4, further comprising user operation means, wherein a user specifies a page dividing mode through said user operation means, and said dividing means performs said automatic dividing if the user specifies said page dividing mode.

6. The facsimile device of claim 4, wherein the at least two portions of the subject copy are automatically determined according to an overlapping width specified by an operator.

7. The facsimile device of claim 1, wherein the divisional lines of data corresponding to the encoded data output by said outputting means are unchanged in scale.

8. The facsimile device of claim 1, wherein said encoded data output by said outputting means conforms with an A3-size width requirement.

9. The facsimile device of claim 1, wherein each of said at least two read areas is no greater than the A3-size.

10. A method for controlling a facsimile device, the method comprising the steps of:
   (a) inputting through scanner means lane sized copy image data of a large-sized subject copy having a size larger than A3-size;
   (b) automatically dividing automatically dividing in a sub-scanning direction said large-sized copy image data of the large-sized subject copy into at least two read areas according to a specified overlapping width each read area including divisional lines of data having a predetermined width;
   (c) performing an image rotation with respect to each of said divisional lines of data so as to supply rotated divisional lines;
   (d) encoding each of said rotated divisional line into encoded data; and
   (e) outputting said encoded data.

11. The method as claimed in claim 10, wherein said step (c) divides said large-sized image data into said at least two read areas each read width having no greater than an A3-size width.

12. The method as claimed in claim 10, wherein said step (c) divides said large-sized image data of the subject copy at a predetermined page into said divisional lines of data.

* * * * *